United States Patent [19]

Davies et al.

[11] Patent Number: 5,665,825
[45] Date of Patent: Sep. 9, 1997

[54] PLAIN BEARING MATERIAL

[75] Inventors: Glyndwr John Davies; Philip Moisey, both of Rugby, England

[73] Assignee: T&N Technology Limited, Rugby, England

[21] Appl. No.: 495,549

[22] PCT Filed: Jan. 24, 1994

[86] PCT No.: PCT/GB94/00134

§ 371 Date: Jul. 31, 1995

§ 102(e) Date: Jul. 31, 1995

[87] PCT Pub. No.: WO94/18271

PCT Pub. Date: Aug. 18, 1994

[30] Foreign Application Priority Data

Feb. 9, 1993 [GB] United Kingdom ............... 9302533

[51] Int. Cl.$^6$ ............................. C08L 81/00; C08L 27/18
[52] U.S. Cl. ............................. 525/189; 525/535; 525/537
[58] Field of Search ............................. 525/189, 535, 525/537; 524/546, 609

[56] References Cited

U.S. PATENT DOCUMENTS

| | | | |
|---|---|---|---|
| 4,172,622 | 10/1979 | Baker et al. | 308/237 R |
| 4,493,917 | 1/1985 | Bailleux et al. | 525/189 |
| 5,159,019 | 10/1992 | Yamamoto et al. | 525/189 |
| 5,470,901 | 11/1995 | Ishiwari et al. | 525/189 |

FOREIGN PATENT DOCUMENTS

| | | | |
|---|---|---|---|
| 2121722 | 1/1984 | United Kingdom . | |
| WO94/05728 | 3/1994 | WIPO | C08L 27/12 |

*Primary Examiner*—Peter A. Szekely
*Attorney, Agent, or Firm*—Synnestvedt & Lechner

[57] ABSTRACT

A plain bearing is disclosed comprising a bearing layer bonded to a sintered metallic layer, which in turn is mounted on a backing plate. The bearing layer comprises a material formed from two interpenetrating networks, one of polytetrafluoroethylene and the other of polyphenylenesulphide. The percentage by volume of polyphenylenesulphide is between about 45% and about 55%.

1 Claim, No Drawings

PLAIN BEARING MATERIAL

This invention is concerned with a plain bearing material and a method of making same.

A very successful plain bearing material was developed by the Glacier Metal Company. This material is called "DU" and consists essentially of polytetrafluoroethylene with a filler of about 20% by volume of lead. The material forms a surface layer providing a wear resistant surface layer and infiltrates a sintered metallic layer, e.g. of bronze, secured to a steel backing. The polytetrafluoroethylene in the surface layer imparts low friction characteristics and the lead is necessary for the dry wear resistance of the material. DU finds application in plain bushes and thrust washers.

It is desirable to develop a lead free plain bearing material with equivalent or superior properties to DU. Many attempts have been made but without success. Such attempts have concentrated on improving strength by using different fillers in approximately the same proportion as lead. Significant reductions in the proportion of polytetrafluoroethylene was not seen as a feasible option as this was expected to reduce the low friction characteristics and hence the wear resistance. Furthermore, the addition of more filler to the polytetrafluoroethylene was difficult since working the polytetrafluoroethylene to mix it with a filler causes it to fibrillate and become unworkable so that it cannot be successfully infiltrated into sintered metallic material. Indeed, DU has to be applied with considerable care to avoid fibrillation.

It is an object of the present invention to provide a lead free plain bearing material with improved wear resistance.

The invention provides a plain bearing material formed from two interpenetrating networks, one of polytetrafluoroethylene and the other of polyphenylene sulphide.

A bearing material according to the invention is found to have a very greatly improved wear resistance when compared to DU. The wear resistance achieved in tests is ten times better than any previously-known DU substitute not containing lead. Indeed the wear resistance is up to five times better than DU itself. Polyphenylene sulphide has been proposed as a plain bearing material (see GB Patent Specification No. 1,475,295) and that specification suggests the addition of a small amount of polytetrafluoroethylene to improve low friction characteristics. This material would be essentially a polyphenylene sulphide matrix containing particles of polytetrafluoroethylene whereas the material of the invention has interpenetrating polyphenylene sulphide and polytetrafluoroethylene matrices. Bearing materials are also known which have up to about 20% by volume of polyphenylene sulphide mixed into polytetrafluoroethylene. This material is a polytetrafluoroethylene matrix containing polyphenylene sulphide particles. The wear resistances of these materials do not approach that of the invention.

Preferably, the percentage by volume of polyphenylene sulphide is between 45 and 55%. Excellent wear test results are obtained when the percentage is approximately 50. The material may be infiltrated into a sintered metallic layer mounted on a backing plate.

A material according to the invention may be manufactured by encapsulating polytetrafluoroethylene particles in resin, e.g. an acrylic resin, mixing the encapsulated particles with particles of polyphenylene sulphide, applying heat and pressure to cross-link the material and form it into a smooth bearing surface.

The encapsulation of the polytetrafluoroethylene particles prevents them from fibrillating during mixing and application and the acrylic resin can be burnt off without leaving a residue.

In order to facilitate mixing, the polyphenylene sulphide particles may also be encapsulated in resin, e.g. acrylic resin, before mixing with the encapsulated polytetrafluoroethylene.

The mixing of the particles is facilitated if they are mixed as aqueous dispersions.

Alternatively, a material according to the invention may be manufactured by melt compounding the polytetrafluoroethylene and polyphenylene sulphide, extruding the compounded material on to a support, e.g. as a tape on to a sintered metallic layer, and bonding the extruded material to the support, e.g. by heat and pressure so that the material infiltrates the metallic layer.

There now follows a detailed example which is illustrative of the invention.

In the illustrative example a plain bearing material was formed from two interpenetrating networks one of polytetrafluoroethylene and the other of polyphenylene sulphide, both materials being present in 50% by volume.

Firstly, an aqueous dispersion of polyphenylene sulphide particles encapsulated in acrylic resin was formed. This was achieved by mixing polyphenylene sulphide particles, water, polymethyl methacrylate, and usual additives, such as surfactants, in a high shear mixer.

Next, an aqueous dispersion of polytetrafluoroethylene particles encapsulated in acrylic resin was formed. This was achieved by mixing polytetrafluoroethylene particles, water, polymethyl methacrylate, kerosine (as a lubricant) and usual additives, such as surfactants, in a high shear mixer.

Next, the two aqueous dispersions described above were mixed together in a high shear mixer giving an aqueous dispersion containing approximately equal quantities by volume of encapsulated particles of polyphenylene sulphide and polytetrafluoroethylene. To this a coagulant (aluminium sulphide) was added and the water was decanted. This gave a wet "mush" which was applied to the surface of a sintered metallic layer formed on a steel backing layer. The mush was rolled to flatten it and to force it into the interstices of the sintered metallic layer. The resulting strip of bearing material was then heated to dry it and burn off the acrylic resin and cured at 375° C. This gave a bearing material with a smooth bearing surface comprising substantially equal proportions of cross-linked polyphenylene sulphide and polytetrafluoroethylene forming interpenetrating networks.

The bearing material was subjected to a wear test in which the number of hours to achieve a predetermined wear depth was measured. The DU material referred to above was measured at 680 hours whereas the material of the example exceeded 4000 hours.

We claim:

1. A plain bearing material comprising:

a material having interpenetrating networks of polytetrafluoroethylene and polyphenylenesulphide and wherein said material comprises substantially similar portions by volume of said polytetrafluoroethylene and said polyphenylenesulphide.

* * * * *